United States Patent
Kwok et al.

(10) Patent No.: US 11,089,512 B2
(45) Date of Patent: Aug. 10, 2021

(54) DUAL CONNECTIVITY FLOW CONTROL

(71) Applicant: T-Mobile USA, Inc., Bellevue, WA (US)

(72) Inventors: Ming Shan Kwok, Seattle, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 117 days.

(21) Appl. No.: 16/442,314

(22) Filed: Jun. 14, 2019

(65) Prior Publication Data

US 2020/0396643 A1    Dec. 17, 2020

(51) Int. Cl.
| | |
|---|---|
| *H04W 28/08* | (2009.01) |
| *H04W 76/15* | (2018.01) |
| *H04W 28/02* | (2009.01) |
| *H04W 80/08* | (2009.01) |

(Continued)

(52) U.S. Cl.
CPC ........... *H04W 28/085* (2013.01); *H04L 45/24* (2013.01); *H04L 47/125* (2013.01); *H04W 28/0236* (2013.01); *H04W 28/0268* (2013.01); *H04W 28/0273* (2013.01); *H04W 28/0278* (2013.01); *H04W 28/0284* (2013.01);
(Continued)

(58) Field of Classification Search
CPC ............. H04W 76/15; H04W 28/0236; H04W 28/085; H04W 28/0273; H04W 28/0278; H04W 28/0975; H04W 28/0808; H04W 76/16; H04L 47/286; H04L 45/24; H04L 47/125; H04L 47/283; H04L 45/38; H04L 1/1887
See application file for complete search history.

(56) References Cited

U.S. PATENT DOCUMENTS

| | | |
|---|---|---|
| 2013/0136067 A1 | 5/2013 | Praveenkumar et al. |
| 2017/0201366 A1* | 7/2017 | Chamorro ............. H04L 5/0098 |
| 2019/0098640 A1* | 3/2019 | Holakouei ............ H04L 1/1874 |

(Continued)

FOREIGN PATENT DOCUMENTS

| | | |
|---|---|---|
| WO | WO2016180925 A1 | 11/2016 |
| WO | WO2017182927 A1 | 10/2017 |
| WO | WO2018202933 A1 | 11/2018 |

OTHER PUBLICATIONS

Extended European Search Report dated Nov. 16, 2020 for European Patent Application No. 20176960.1, 9 pages.

*Primary Examiner* — Omer S Mian

(74) *Attorney, Agent, or Firm* — Lee & Hayes, P.C.

(57) ABSTRACT

User equipment (UE) can be connected to both a first base station and a second base station. A flow controller at the first base station can determine packet latency goals associated with packets. The flow controller can also determine connection latencies associated with a first connection from the first base station to the UE and a second connection from the second base station to the UE, where one leg of a split bearer passes from the first base station to the UE over the first connection and another leg of the split bearer passes from the first base station to the second base station and then to the UE over the second connection. The flow controller can route packets with lower packet latency goals via the leg of the lower-latency connection, and route other packets with higher packet latency goals over the leg of the higher-latency connection.

17 Claims, 9 Drawing Sheets

(51) Int. Cl.
  *H04L 12/707* (2013.01)
  *H04L 12/803* (2013.01)
(52) U.S. Cl.
  CPC ... *H04W 28/0808* (2020.05); *H04W 28/0975* (2020.05); *H04W 76/15* (2018.02); *H04W 80/08* (2013.01)

(56) References Cited

U.S. PATENT DOCUMENTS

2019/0191474 A1* 6/2019 Jin .......................... H04L 1/20
2020/0196384 A1* 6/2020 Liu ........................ H04L 69/30

* cited by examiner

DUAL CONNECTIVITY FLOW CONTROL

BACKGROUND

Dual connectivity arrangements can allow user equipment (UE), such as a mobile phone, to wirelessly connect to different base stations of a telecommunication network simultaneously. In some cases, the base stations can use different radio access technologies. For example, a UE can connect to one base station using a 5G New Radio connection and also connect to another base station using a Long-Term Evolution (LTE) connection.

In some situations in which a UE is connected to different base stations, a split bearer can be established through both base stations to transport data between a core network and the UE. The split bearer can pass from the core network to a first base station, where the split bearer can divide into a first leg and a second leg. The first leg of the split bearer can continue through the first base station to the UE. The second leg of the split bearer can pass from the first base station to a second base station, and the second leg can continue from the second base station to the UE.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1A:
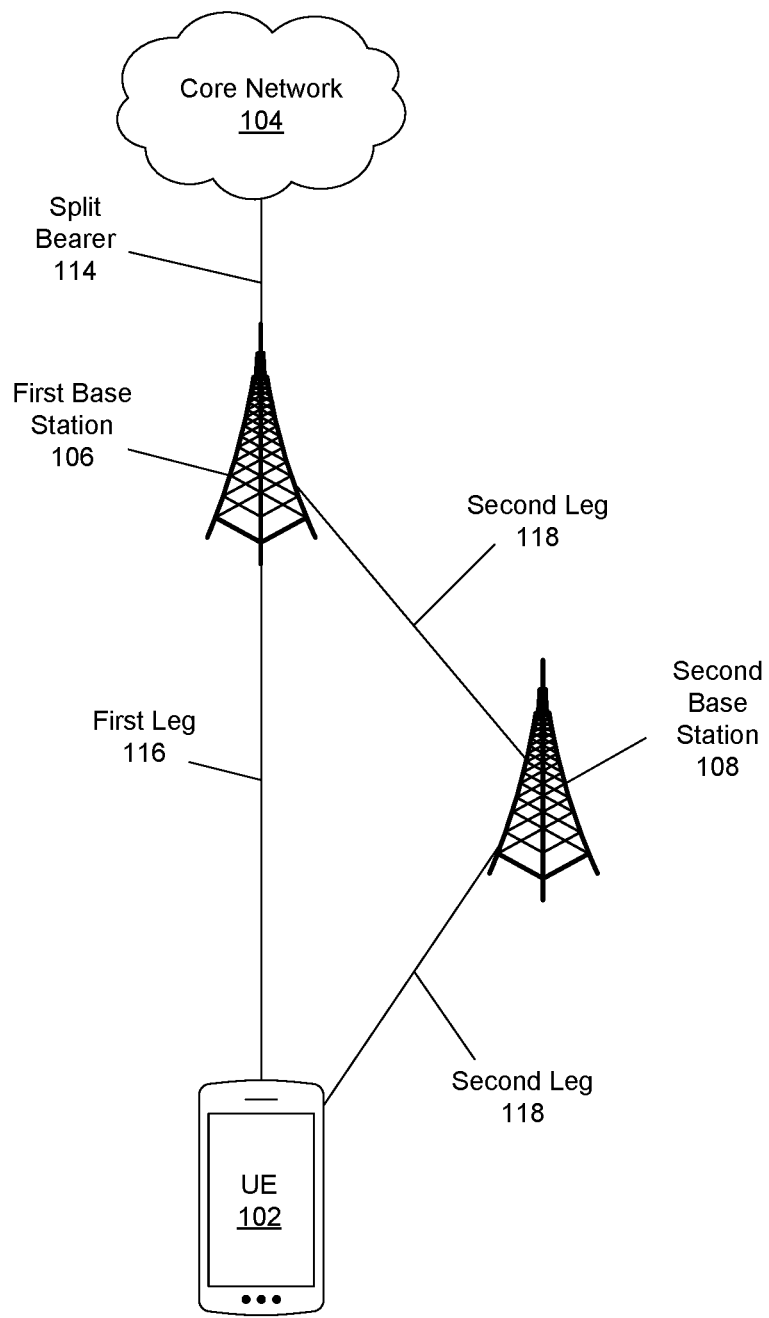
FIG. 1A depicts an example network environment in which user equipment (UE) can connect to a telecommunication network using a dual connectivity arrangement with a first base station and a second base station.

Multiple radio access technology (RAT) Dual Connectivity (MR-DC) techniques have been developed that allow user equipment (UE) to simultaneously connect to different types of base stations associated with a telecommunication network. For example, E-UTRAN New Radio-Dual Connectivity (EN-DC) configurations can allow a UE to connect to two base stations serving as a master node and a secondary node, where an LTE eNB can be the master node and a 5G gNB can be the secondary node, or vice versa. A split bearer can be established such that user data can flow from a core network to a first base station of the two base stations, and then flow through at least one of a first leg of the split bearer that passes through the first base station to the UE and a second leg of the split bearer that passes from the first base station to the second base station and then to the UE.

However, although MR-DC techniques can allow data to flow from a network to a UE through either or both the first base station and the second base station, in many implementations base stations are configured such that data flows only through the first base station to the UE unless the first base station cannot timely deliver the data to the UE, at which point the first base station begins sending some of the data to the second base station to pass along to the UE. For example, the first base station may have a buffer where it stores packets to be transmitted to a UE. If the buffer at the first base station overflows, the first base station may begin sending some or all packets to the second base station instead of attempting to continue storing the packets in the full buffer, and the second base station can then deliver the packets to the UE.

In some examples, the first base station can use downlink Packet Data Convergence Protocol (PDCP) aggregation to aggregate data packets into a first group for a first leg of a split bearer and a second group for a second leg of the split bearer. In some cases, this can lead to bandwidth improvements relative to using only one leg, as the aggregate bandwidth available for data transmissions to a UE when using both legs of the split bearer can be up to the sum of the bandwidth associated with a first connection from the first base station to the UE and the bandwidth associated with a second connection from the second base station to the UE.

However, many previous solutions only use PDCP aggregation and/or route data through both legs of a split bearer if a buffer overrun has occurred or is likely to occur at the first base station and at that point only make static routing decisions based on whether each new packet can fit into the first base station's buffer. For example, some previous solutions use a static algorithm in the first base station that defaults to routing each new packet through the first base station unless a buffer of the first base station is full or is close to full. Accordingly, individual packets are only sent via the second base station if the first base station's buffer node is full or is close to full.

Although such previous solutions can help deliver packets to a UE that would have otherwise been delayed or even dropped due to a buffer overflow at the first base station, using the second base station only when the first base station is unable to timely deliver packets to a UE can be an inefficient use of resources. For example, if packets are only being sent to a UE via the first base station, the second base station may be substantially idle with respect to the UE such that available resources at the second base station may be wasted.

Additionally, in such previous solutions, individual packets associated with high priority and/or low-latency services may end up being routed according to a static algorithm through a slower connection through a second base station when the first base station's buffer is full. Accordingly, latency metrics associated with the time it takes to transmit individual packets to a UE can be negatively affected even if using both legs of a split bearer can improve the overall available bandwidth. For example, many previous PDCP aggregation implementations prioritize bandwidth improvement, but can negate latency benefits often associated with 5G connections relative to LTE connections.

Described herein are systems and processes by which a first base station can evaluate packet latency goals associated with individual data packets, and in response route individual packets over either a first leg or a second leg of a split bearer depending on connection latencies associated with the two legs. For example, if the first base station determines that a data packet is associated with a low-latency service and thus has a low packet latency goal, it can route that data packet through a leg of the split bearer that is currently associated with a lower connection latency than the other leg.

Example Environment

Figure 1B:
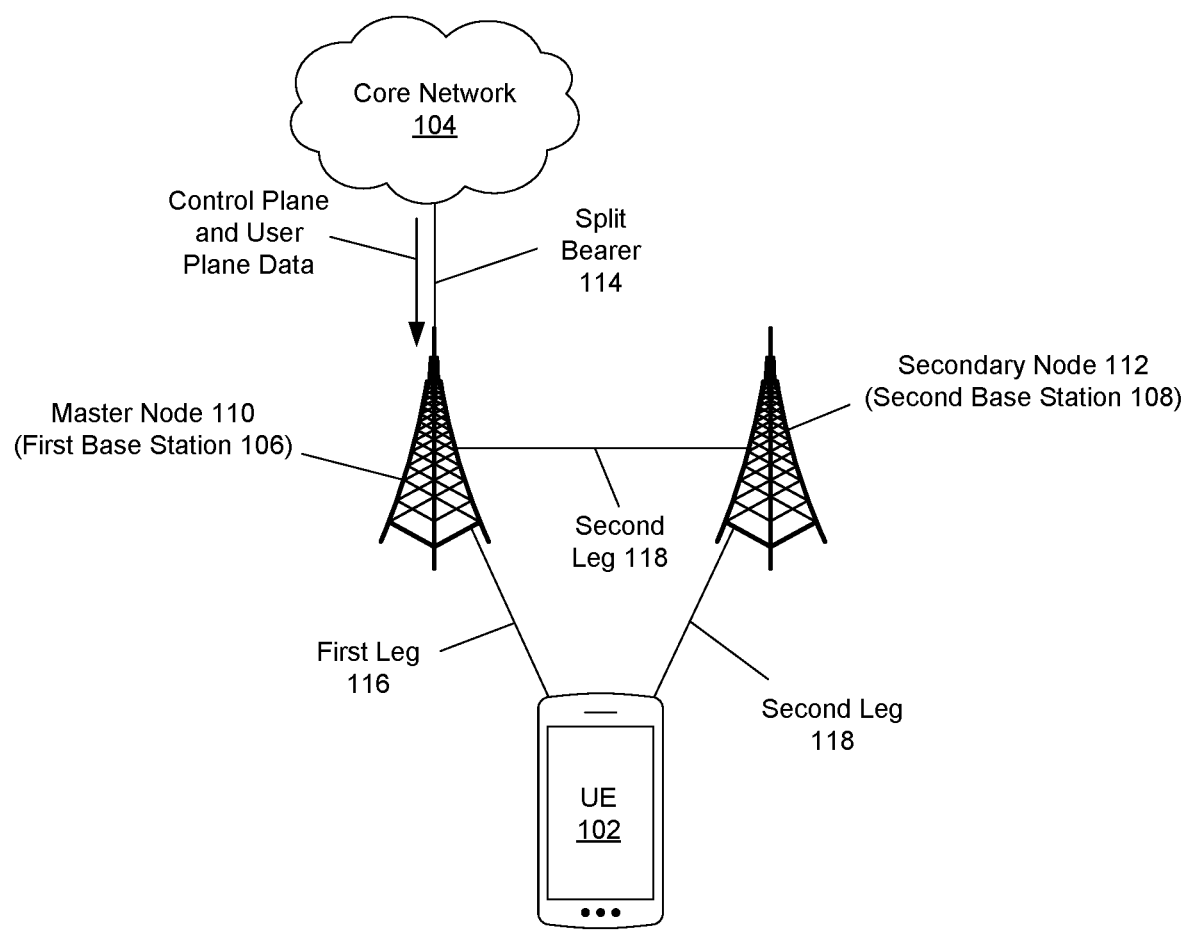
FIG. 1B depicts an example network environment in which a first base station is a master node and a second base station is a secondary node in a dual connectivity arrangement.
Figure 1C:
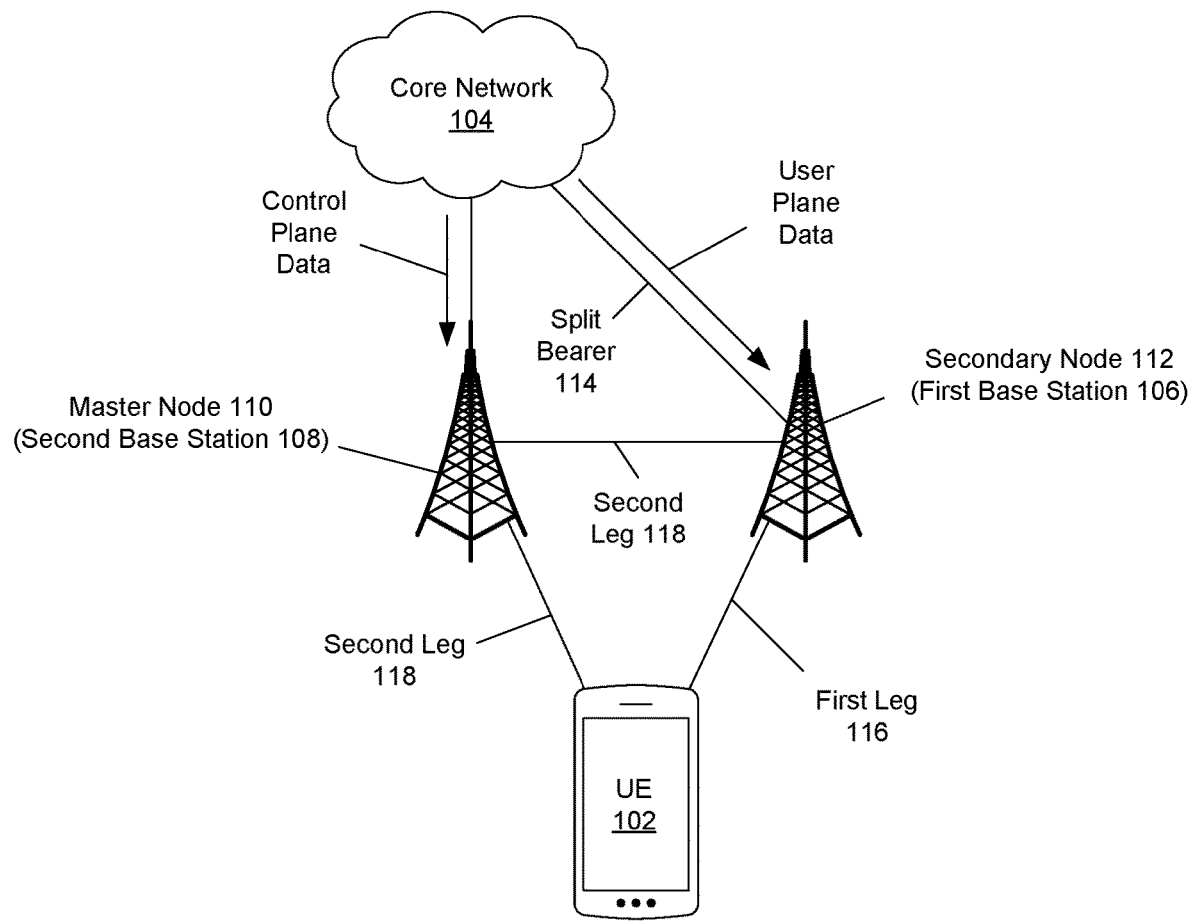
FIG. 1C depicts an example network environment in which a first base station is a secondary node and a second base station is a master node in a dual connectivity arrangement.

FIGS. 1A-1C depict example network environments in which user equipment (UE) 102 can connect to a telecommunication network to engage in communication sessions for voice calls, video calls, messaging, data transfers, or any other type of communication. A UE 102 can be any device that can wirelessly connect to the telecommunication network. For example, a UE 102 can be a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device. Example architecture for a UE 102 is illustrated in greater detail in FIG. 5 and is described in detail below with reference to that figure.

The telecommunication network can have an access network including base stations and/or other access points, as well as a core network 104 linked to the access network. UEs 102 can wirelessly connect to base stations or other access points of the access network, and in turn be connected to the core network 104. The access network and/or core network 104 can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology. An LTE base station in the access network can be referred to as an evolved Node B (eNB), while a 5G base station can be referred to as a gNB. In some examples, the core network 104 can be a packet core network of an LTE network, which may be referred to as an Evolved Packet Core (EPC). In other examples, the core network 104 can be a 5G core.

As shown in FIGS. 1A-1C, a UE 102 and the telecommunication network can be configured to support dual connectivity between the UE 102 and multiple base stations in the access network. In a dual connectivity arrangement, the UE 102 can be connected to a first base station 106 and also be connected to a second base station 108. In some examples, the first base station 106 can use a different radio access technology (RAT) than the second base station 108 to connect to the UE 102, such that dual connectivity to the first base station 106 and the second base station 108 can be referred as Multi-RAT Dual Connectivity (MR-DC). For example, when a UE 102 is compatible with both 5G and LTE protocols, the UE 102 can connect to both a 5G New Radio (NR) base station in a 5G access network and an LTE base station in an Evolved Universal Mobile Telecommunications System (UMTS) Terrestrial Radio Access Network (E-UTRAN), and the dual connectivity arrangement can be referred to as an E-UTRAN New Radio-Dual Connectivity (EN-DC) arrangement. Example architecture for a first base station 106 is illustrated in greater detail in FIG. 4 and is described in detail below with reference to that figure.

In a dual connectivity arrangement for a UE 102, one or both of the first base station 106 and the second base station 108 can be connected to one or more nodes of the core network 104 to transfer user plane data and/or control plane data for the UE 102, for example over an S1 interface or other interface. The first base station 106 and the second base station 108 can also be connected to each other to transfer user plane data and/or control plane data for the UE 102, for example over an X2 interface or other interface.

In a dual connectivity arrangement for a UE 102, one of the first base station 106 and the second base station 108 can serve as a master node 110, and the other one of the first base station 106 and the second base station 108 can be a secondary node 112, as shown in the examples of FIG. 1B and FIG. 1C. The master node 110 can manage control plane data during for the UE 102, and can accordingly exchange control plane data with the core network 104 over an S1 interface or other interface. The master node 110 may also exchange control plane data with the secondary node 112 over an X2 interface or other interface.

As shown in FIG. 1B, in some examples the master node 110 can also exchange user plane data with the core network 104 over an S1 interface or other interface, and can exchange user plane data with the secondary node 112 over an X2 interface or other interface. In some examples in which the master node 110 receives user plane data from the core network 104 for a UE 102, the master node 110 can be the first base station 106 described herein.

However, as shown in FIG. 1C, in other examples the secondary node 112 can itself have a connection with the core network 104 for user plane data over an Si interface or other interface. In these examples, the secondary node 112 may directly receive user plane data for a UE 102 from the core network 104, and can then route that user plane data to the UE 102 directly and/or through the master node 110. In some examples in which the secondary node 112 receives user plane data from the core network 104 for a UE 102, the secondary node 112 can be the first base station 106 described herein.

As noted above, the master node 110 can use a different radio access technology to communicate with the UE 102 than the secondary node 112. The master node 110, the secondary node 112, and/or the core network 104 can be interconnected based on a 3GPP "option 3x" EN-DC configuration, or be interconnected using "option 3," "option 3a," or other EN-DC configurations. In some of these examples, an LTE eNB can serve as the master node 110 and a 5G gNB can serve as the secondary node 112. In other examples, a 5G gNB can serve as the master node 110 and an LTE eNB can serve as the secondary node 112.

When a UE 102 connects to the core network 104, one or more bearers can be established between the core network 104 and the UE 102. Bearers can be virtual channels used to transport data for a UE 102 between network elements. For example, an E-UTRAN Radio Access Bearer (E-RAB) can be established between a gateway of the core network 104 and the UE 102, with the E-RAB including an S1 bearer between the gateway of the core network 104 and an eNB, and a data radio bearer between the eNB and the UE 102. Multiple bearers can be set up between the same network elements for different types of traffic for the same UE 102. For example, a telecommunication network can set up a default bearer for general traffic associated with the UE 102, as well as dedicated bearers for traffic associated with specific services. For instance, a dedicated bearer can be set up for voice call data when the UE 102 is engaged in a voice call.

In the dual-connectivity arrangements shown in FIGS. 1A-1C, at least one bearer between the core network 104 and the UE 102 can be established as a split bearer 114 that passes through both the first base station 106 and the second base station 108. For example, a split bearer 114 can go from the core network 104 to the first base station 106, where the split bearer 114 splits into a first leg 116 that goes from the first base station 106 to the UE 102 and a second leg 118 that goes from the first base station 106 to the second base station 108 and then to the UE 102. In the example of FIG. 1B, in which the first base station 106 is a master node 110, the split bearer 114 can pass over a user plane data connection from the core network 104 to the master node 110 and divide at the master node 110 into a first leg 116 to the UE 102 and into a second leg 118 to the secondary node 112. In the example of FIG. 1C, in which the first base station 106 is a secondary node 112, the split bearer 114 can pass over a user plane data connection from the core network 104 to the secondary node 112 and divide at the secondary node 112 into a first leg 116 to the UE 102 and into a second leg 118 to the master node 110.

Accordingly, in some examples, when the core network 104 transmits data for the UE 102 over a split bearer 114 to the first base station 106, the data can be routed to the UE 102 through either the first leg 116 passing through the first base station 106 or through the second leg 118 passing through the second base station 108. In other examples, the telecommunication network can be configured to route copies of the same data over both the first leg 116 and the second leg 118 in some situations to increase the chances that the UE 102 successfully receives at least one of the copies.

Figure 2:
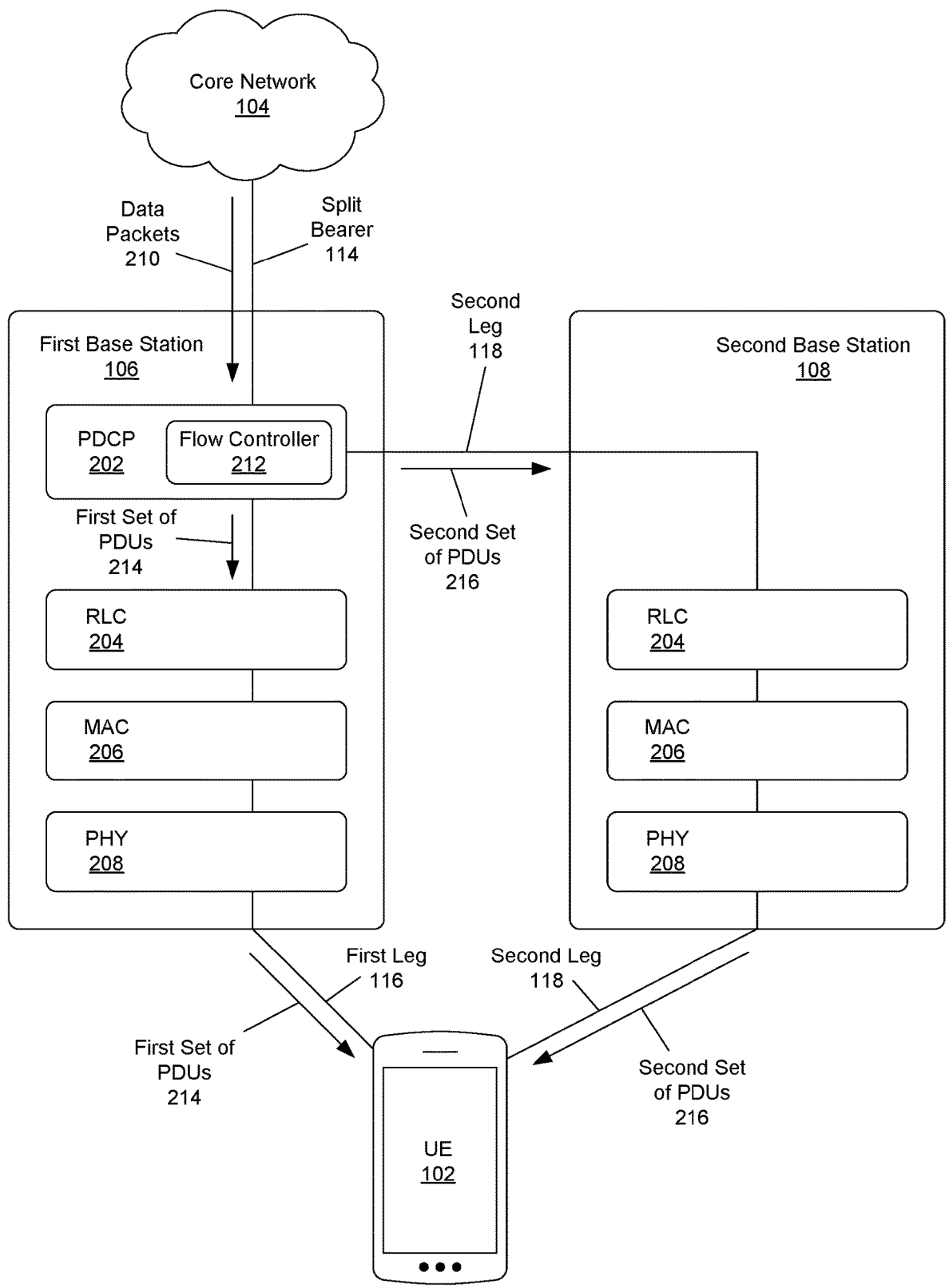
FIG. 2 depicts downlink data on a split bearer passing through protocol layers in a first base station and a second base station.

FIG. 2 depicts downlink data on a split bearer 114 passing through protocol layers in a first base station 106 and a second base station 108. Downlink data can pass through multiple layers of a protocol stack in a first base station 106 and/or a second base station 108 before being transmitted to a UE 102. Each layer may process data received from a previous layer, for instance by adding its own header or performing any other operation on the data, and then pass the data to the next layer. When the data is received at a UE 102, corresponding layers at the UE 102 can reverse the operations performed by layers in the first base station 106 or the second base station 108 to find or reconstruct the data that was originally sent by the core network 104. The layers in the protocol stack can include a Packet Data Convergence Protocol (PDCP) layer 202, a Radio Link Control (RLC) layer 204, a Media Access Control (MAC) layer 206, and/or a physical (PHY) layer 208. In some examples, such as when a protocol stack used by a node is a 5G NR protocol stack (for instance when the first base station 106 is a 5G gNB), a Service Data Adaptation Protocol (SDAP) layer may be present above the PDCP layer 202.

The PDCP layer 202 of the first base station 106 can receive data packets 210, such as Internet Protocol (IP) packets for user plane data, from the core network 104. In some examples, such as if the first base station 106 is a 5G gNB, the PDCP layer 202 can receive the data packets 210 within service data units (SDUs) output by an upper SDAP layer at the first base station 106. The PDCP layer 202 can operate on the data packets 210 and output protocol data units (PDUs) that include one or more portions of one or more of the data packets 210 on to the next layer, such as an RLC layer 204. For example, the PDCP layer 202 can perform one or more operations on data packets 210, such as adding a PDCP header or performing header compression, ciphering, and/or integrity protection, and output the results as PDUs to an RLC layer 204.

The PDCP layer 202 at the first base station 106 can be where a split bearer 114 divides into a first leg 116 and a second leg 118. A flow controller 212 of the first base station 106 can operate on data at the PDCP layer 202 to group, aggregate, or divide data packets 210 received from the core network 104 into a first set of PDUs 214 and a second set of PDUs 216. The flow controller 212 can route the first set of PDUs 214 via the first leg 116 of the split bearer 114, and can route the second set of PDUs 216 via the second leg 118 of the split bearer 114. Aggregation of data packets 210 at the PDCP layer 202 into different sets of PDUs for different legs of a split bearer 114 can be referred to as "downlink PDCP aggregation."

The flow controller 212 can route the first set of PDUs 214 through the first leg 116 of the split bearer 114 by passing the first set of PDUs 214 to the RLC layer 204 of the first base station 106. The flow controller 212 can also route the second set of PDUs 216 through the second leg 118 of the split bearer 114 by passing the second set of PDUs 216 to the RLC layer 204 of the second base station 108. For example, the flow controller 212 can cause the second set of PDUs 216 to be transmitted from the first base station 106 to the second base station 108 over an X2 interface or other interface. In some examples, because the data has already been processed at a PDCP layer 202 of the first base station 106, the second set of PDUs 216 can be passed directly to the RLC layer 204 of the second base station 108, or be passed through a PDCP layer 202 of the second base station 108 to the RLC layer 204 of the second base station 108.

An RLC layer 204 at the first base station 106 can accordingly receive the first set of PDUs 214 output by the PDCP layer 202 of the first base station 106, while a similar RLC layer 204 at the second base station 108 can receive the second set of PDUs 216 output by the PDCP layer 202 of the first base station 106. The respective RLC layers 204 at the first base station 106 and the second base station 108 can process the PDUs, such as by performing functions including error detection, segmentation, re-segmentation, or other operations. Each RLC layer 204 can pass its output to a MAC layer 206, which can perform other operations including error correction, scheduling, or prioritization. Each MAC layer 206 can similarly pass its output to a PHY layer 208, where the data can be transmitted to the UE 102 over an air interface.

The RLC layer 204, the MAC layer 206, and/or the PHY layer 208 may each process or encapsulate data received from upper layers into its own output. However, the data sent by the PHY layer 208 of the first base station 106 can include the first set of PDUs 214 that was output by the PDCP layer 202 of the first base station 106. The data sent by the PHY layer 208 of the second base station 108 can similarly include the second set of PDUs 216 that was output by the PDCP layer 202 of the first base station 106. The UE 102 can accordingly process received data at a PHY layer 208 of the UE 102, a MAC layer 206 of the UE 102, and an RLC layer 204 of the UE 102 to find or reconstruct the first set of PDUs 214 and the second set of PDUs 216. The UE 102 can also process the first set of PDUs 214 and the second set of PDUs 216 at a PDCP layer 202 of the UE 102 to reconstruct the data packets 210 originally sent by the core network 104.

In some examples, bandwidths associated with connections between the first base station 106 and the second base station 108 to a UE 102 may differ. For instance, a first connection between the first base station 106 and the UE 102 may have an available bandwidth of X megabits per second (Mbps), and a second connection between the second base station 108 and the UE 102 may have an available bandwidth of Y Mbps. Accordingly, when a split bearer 114 is used to send data through both the first leg 116 via the first connection and the second leg 118 via the second connection, for instance using PDCP aggregation, the total available bandwidth for data transfers to the UE 102 may be up to X+Y Mbps. The maximum bandwidth to a UE 102 can thus be increased, relative to using only one or the first base station 106 or the second base station 108, by routing data through both legs of a split bearer 114 via both the first base station 106 and the second base station 108.

However, the connection latency associated with data transfers over one leg of a split bearer 114 may be higher than the connection latency associated with data transfers over the other leg of the split bearer 114, even if using both legs improves the overall available bandwidth. For example, the first base station 106 and the second base station 108 may use different radio access technologies to communicate with the UE 102, and connections through different types of radio access technologies may be associated with different connection latencies.

As an example, standards developed for 5G connections may lead to lower connection latencies for 5G data transmissions on average than LTE data transmissions. For instance, if the first base station 106 is a 5G gNB and the second base station 108 is an LTE eNB, the first leg 116 of the split bearer 114 may pass data over a 5G connection with a connection radio access network (RAN) latency of 1 millisecond, while the second leg 118 of the split bearer 114 may pass data over an LTE connection with a connection RAN latency of 10 milliseconds. In other examples, connection latencies associated with connections using different types of radio access technologies may have any other values or relative difference.

Data packets 210 for services where delays in packet delivery may impact user experience or time-sensitive operations can be considered "low-latency packets" with low packet latency goals. Examples of low-latency packets include data packets 210 for voice calls, video calls, video-conferencing, streaming video, and data packets 210 for Ultra-Reliable and Low-Latency Communication (URLLC) services such as industrial automation, remote driving and other transportation services, and remote surgery and other remote healthcare services. In contrast, delayed delivery of data packets 210 for web browsing, text messages, and other types of services that are not as time-sensitive may be less noticeable for users.

Header information or other information in data packets 210 can directly or indirectly indicate packet latency goals associated with the data packets 210. Packet latency goals can be latency goals, parameters, targets, or requirements that are directly expressed in data packets 210 or can be inferred from data in data packets 210. For example, if a data packet 210 does not directly indicate a packet latency goal for the data packet 210, header information may indicate a priority level, a service type, a Quality of Service (QoS) values, a Class of Service (CoS) value, or any other information that can be mapped to a corresponding packet latency goal. For example, if a first data packet 210 has a header indicating a higher priority level than a second data packet 210, the higher priority level can map to a lower packet latency goal.

In some examples, a packet latency goal associated with a data packet 210 can be indicated by a Differentiated Services Code Point (DSCP) field in an IP header of the data packet 210. In various examples, different DSCP values may be mapped to different QoS classes, CoS levels, service types, traffic types, priority levels, and/or packet latency goals. For example, in some examples a DSCP value of "0" can indicate a "best effort" packet, while a DSCP value of 48 can indicate a "high priority" packet, such as a data packet 210 associated with voice call data or another type of low-latency packet.

In other examples, a packet latency goal associated with a data packet 210 can be indicated in an SDAP header of the data packet 210. For example, in 5G communications, an SDAP layer may have added an SDAP header data to a data packet 210 that contains QoS information about the data packet 210, such as a QoS flow identifier used to identify data packets 210 associated with the same QoS flow. A QoS flow identifier can indicate a QoS level associated with the data packet 210, which may map to a particular packet latency goal. In some examples, other types of data may be included in an SDAP header, such as a type of service identifier or other data from which a packet latency goal can be inferred.

Accordingly, a flow controller 212 can perform packet inspection operations on data packets 210 received at the PDCP layer of the first base station 106 to determine packet latency goals associated with the data packets 210. For example, the flow controller 212 can identify a DSCP value in an IP header of a data packet and map that value to a packet latency goal. As another example, the flow controller 212 can identify a QoS flow identifier and/or an associated QoS Class Identifier (QCI) from an SDAP header and map the that information to a packet latency goal.

The flow controller 212 can also measure, estimate, or otherwise obtain connection latencies associated with connections to the UE 102 over the first leg 116 and the second leg 118. For example, the flow controller 212 or other elements of the first base station 106 and/or second base station 108 can measure a round-trip time (RTT) between when data is sent to a UE 102 and when a response is received from the UE 102, and use the RTT as a measure of the connection latency of the corresponding connection. The flow controller 212 or other elements of the first base station 106 and/or second base station 108 may also measure radio conditions, available bandwidth, network congestion levels, numbers of connections to the first base station 106 and/or second base station 108, buffer fullness levels at the first base station 106 and/or second base station 108, and/or any other data associated with how quickly the first base station 106 and/or second base station 108 can transmit data to the UE 102, and use that information when measuring or estimating connection latencies associated with the connections to the UE 102 over the first leg 116 and the second leg 118.

The flow controller 212 can perform a comparison of a first connection latency associated with a first connection over which the first leg 116 passes against a second connection latency associated with a second connection over which the second leg 118 passes. From this comparison, the flow controller 212 can determine which of the first connection between the first base station 106 and the UE 102 or the second connection between the second base station 108 and the UE 102 has the lower connection latency, and thus determine which leg of the split bearer 114 is associated with the lower connection latency.

The flow controller 212 can accordingly route data packets 210 with lower packet latency goals over the leg of the split bearer 114 that is associated with the lower connection latency, and route data packets 210 with higher packet latency goals over the leg of the split bearer 114 that is associated with the higher connection latency. For example, if the first leg 116 is associated with a lower connection latency than the second leg 118, the flow controller 212 can place data packets 210 that have lower packet latency goals into the first set of PDUs 214 sent over the lower-latency first leg 116. The flow controller 212 can similarly place other data packets 210 with higher packet latency goals into the second set of PDUs 216 sent over the higher-latency second leg 118. However, if the first base station 106 is under heavy load, poor radio conditions, and/or any other factor associated with the first connection has caused the first leg 116 to have a higher connection latency than the second leg 118, the flow controller 212 may instead place data packets 210 that have lower packet latency goals into the second set of PDUs 216 that are routed over the lower-latency second leg 118 that passes through the second base station 108.

In some examples, the flow controller 212 can be configured with a predefined threshold, such that data packets 210 with packet latency goals above the predefined threshold are routed via the higher-latency leg of the split bearer 114, while data packets 210 with packet latency goals below the predefined threshold are routed via the lower-latency leg of the split bearer 114. In other examples, the flow controller 212 may compare the connection latency associated with each leg against a packet latency goal of each data packet 210, and select the leg that can best meet the packet latency goals of the data packets 210. In some cases, neither leg may have a connection latency low enough to meet a low-latency packet's packet latency goal, but the flow controller 212 can select the leg with the lower connection latency for that low-latency packet as it may come the closest to meeting a packet latency goal associated with the low-latency packet.

Overall, data packets 210 associated with higher priority and/or lower latency services can be delivered to a UE 102 over a leg of a split bearer 114 with a lower connection latency, while lower priority data packets 210 and data packets 210 associated with less time-sensitive services can be delivered to the UE 102 over the leg of the split bearer 114 with a higher connection latency. In many cases, when the first base station 106 is a 5G gNB and the second base station 108 is an LTE eNB, the first leg 116 over the 5G connection to the UE 102 can have a lower connection latency than the second leg 118 over the LTE connection, and the flow controller 212 can accordingly route low-latency packets over the first leg 116 and route higher latency packets over the second leg 118. However, if the 5G connection is congested such that the connection latency of the 5G connection is, or is expected to be, higher than the connection latency associated with the LTE connection, the flow controller 212 can instead choose to route low-latency packets via the second leg 118 through the second base station 108 and route higher latency packets via the first leg 116. In either case, both legs of the split bearer 114 may be used such that overall bandwidth improvements can be obtained due to routing data packets 210 over both connections, but low-latency packets can reach the UE 102 more quickly than higher latency packets.

In some examples, low-latency packets and/or data packets 210 with lower packet latency goals than other data packets 210 can be routed over the lower-latency leg of a split bearer 114 as described above. However, in some examples, copies of such data packets 210 can be sent over both legs of the split bearer 114. For example, data packets 210 for URLLC services may be have low packet latency goals and also high reliability target goals. Accordingly, such URLLC data packets 210 can be sent over both legs such that the latency and reliability goals can be met if the transmission is successful over the lower-latency leg, but at least the reliability goal can be met if transmission is only successful over the higher-latency leg.

Figure 3:
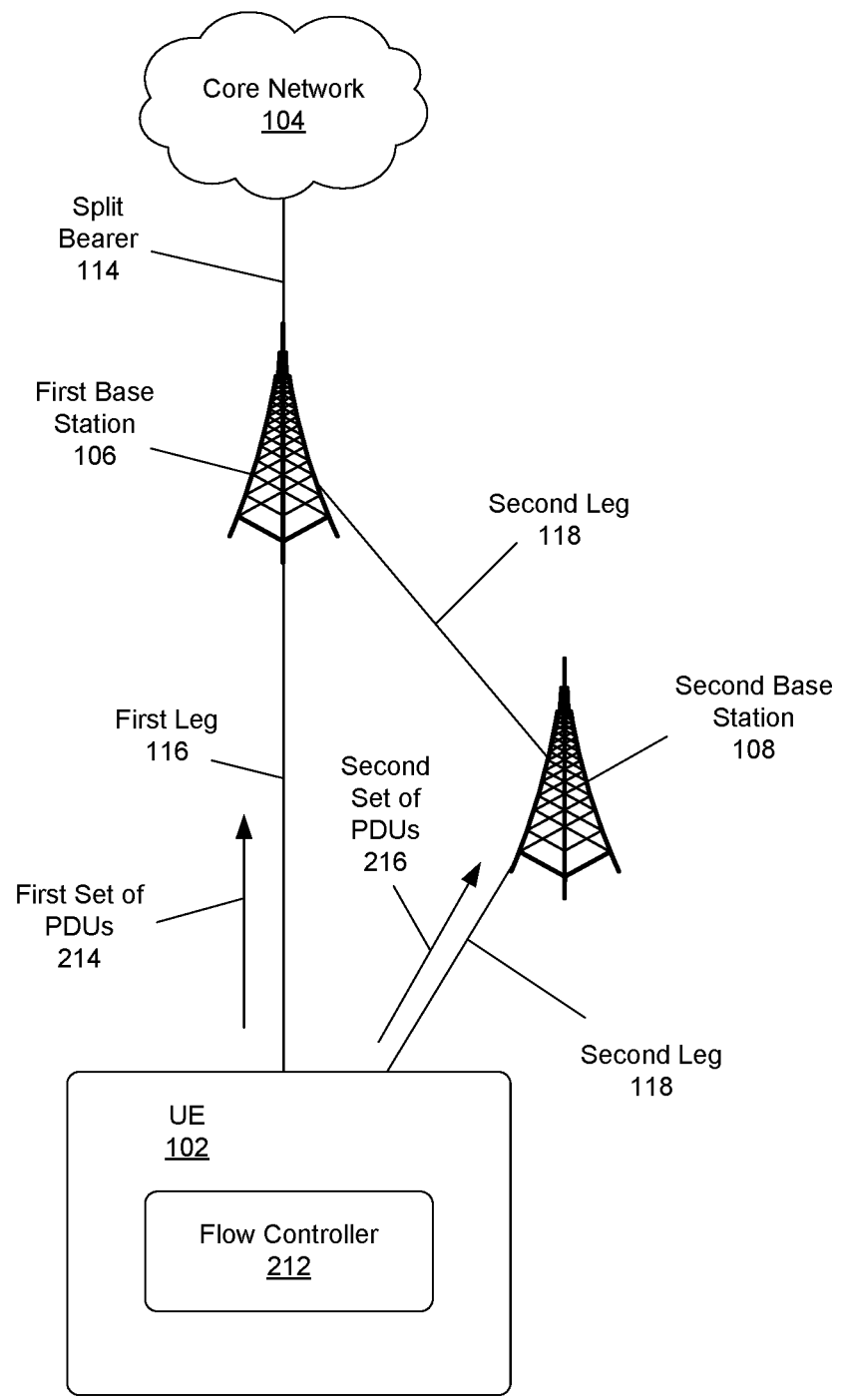
FIG. 3 depicts uplink data passing from a UE through a first leg of a split bearer to a first base station and through a second leg of the split bearer to a second base station.

FIG. 3 depicts uplink data passing from a UE 102 through a first leg 116 of a split bearer 114 to a first base station 106 and through a second leg 118 of the split bearer 114 to a second base station 108. As shown in FIG. 3, in some examples a UE 102 can have a flow controller 212 similar to the flow controller 212 in the first base station 106 that can inspect outgoing data packets to determine or infer packet latency goals and route the outgoing data packets 210 over the first leg 116 or the second leg 118 based on connection latencies associated with the first leg 116 and/or the second leg 118. In some example, the flow controller 212 at the UE 102 can also operate on data at a PDCP layer 202 in the UE 102.

For example, when an application running on the UE 102 generates a data packet 210 that is to be sent by the UE 102 to a server via the core network 104, and the UE 102 is dual connected to both a first base station 106 and a second base station 108 such that a split bearer 114 has been established with the core network 104 through those base stations, the flow controller 212 at the UE 102 can inspect the data packet 210 to determine or infer packet latency goals using methods similar to the packet inspection methods described above with respect to the first base station 106. The UE 102 may also measure connection latencies associated with both legs of the split bearer 114, or be provided with such connection latency information by the first base station 106, the second base station 108, and/or any other network element. The flow controller 212 at the UE 102 can thus identify outgoing low-latency packets and route them over the leg of the split bearer 114 with the lower connection latency, while routing other data packets 210 over the leg of the split bearer 114 with the higher connection latency.

Example Architecture

Figure 4:
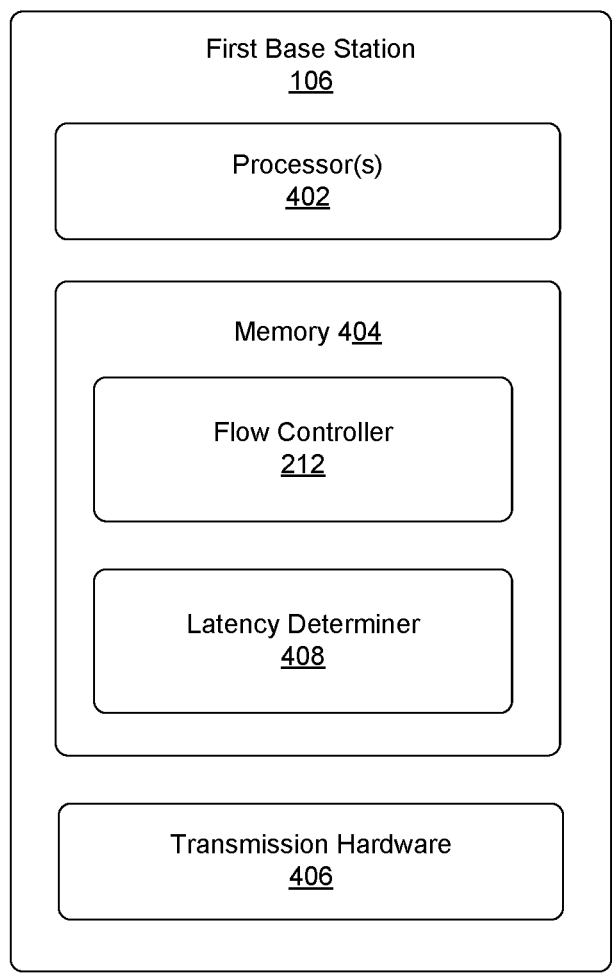
FIG. 4 depicts an example system architecture for a first base station.

FIG. 4 depicts an example system architecture for a first base station 106, in accordance with various examples. In some examples, the first base station 106 can be a 5G base station, such as a gNB. In other examples, the first base station 106 can be an LTE base station, such as an eNB. As shown, the first base station 106 can include processor(s) 402, memory 404, and transmission hardware 406. The memory 404 can store computer-readable instructions and/or other data associated with the flow controller 212, a latency determiner 408, and/or operations of the first base station 106.

In various examples, the processor(s) 402 can be a central processing unit (CPU), a graphics processing unit (GPU), both CPU and GPU, or any other type of processing unit. Each of the one or more processor(s) 402 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 402 may also be responsible for executing all computer applications stored in the memory 404, which can be associated with common types of volatile (RAM) and/or nonvolatile (ROM) memory.

In various examples, memory 404 can include system memory, which may be volatile (such as RAM), non-volatile (such as ROM, flash memory, etc.) or some combination of the two. The memory 404 can also include additional data storage devices (removable and/or non-removable) such as, for example, magnetic disks, optical disks, or tape. Memory 404 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the first base station 106. Any such non-transitory computer-readable media may be part of the first base station 106.

The transmission hardware 406 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with one or more UEs 102, a second base station 108, and a core network 104, and transmit data over such connections. For example, the transmission hardware 406 can establish a connection with a UE 102 over an air interface, a connection with a second base station 108 over an X2 interface, and a connection with a core network 104 over an S1 interface. The transmission hardware 406 can also support transmissions using one or more radio access technologies, such as 5G NR or LTE, as discussed above.

As discussed above, the flow controller 212 can operate at the PDCP layer 202 of the first base station 106. The flow controller 212, or a separate packet inspection module or process that executes at the first base station 106, can perform packet inspection operations on data packets 210 to determine or infer packet latency goals associated with individual data packets. Based on such packet latency goals, the flow controller 212 can determine if individual data packets 210 are to be sent to a UE 102 in a first set of PDUs 214 via a first leg 116 of a split bearer 114 or in a second set of PDUs 216 via a second leg 118 of the split bearer 114. The flow controller 212 can make its determination based on connection latency information about a first connection between the first base station 106 and a UE 102 and a second connection between the second base station 108 and the UE 102.

The latency determiner 408 can measure or estimate a first connection latency associated with a first connection between the first base station 106 and a UE 102, and/or a second connection latency associated with a second connection between the second base station 108 and the UE 102. In some examples, the latency determiner 408 can be an element of the flow controller 212, while in other examples the latency determiner 408 can be one or more separate modules or processes that operate on the first base station 106. In some examples, the second base station 108 can also have a latency determiner 408 that measures or estimates a connection latency associated with a second connection between the second base station 108 and the UE 102 and reports the measured or estimated connection latency to the latency determiner 408 or flow controller 212 of the first base station 106. The latency determiner 408 can provide measurements or estimates of connection latencies associated with the first and second connection to the flow controller 212 for use in determining which leg of the split bearer 114 to route data packets 210 through based on connection latencies of the connections.

In some examples, the latency determiner 408 can measure or estimate a connection latency associated with either connection by measuring a round-trip time (RTT) between when data is sent to a UE 102 over one of the connections and when a response is received from the UE 102, and using the RTT as a measure of the connection latency of the corresponding connection. The latency determiner 408 can also measure, or receive data from other elements about, radio conditions, available bandwidth, network congestion levels, numbers of connections to the first base station 106 and/or second base station 108, buffer fullness levels at the first base station 106 and/or second base station 108, and/or any other data associated with how quickly the first base station 106 and/or second base station 108 can transmit data to the UE 102.

Figure 5:
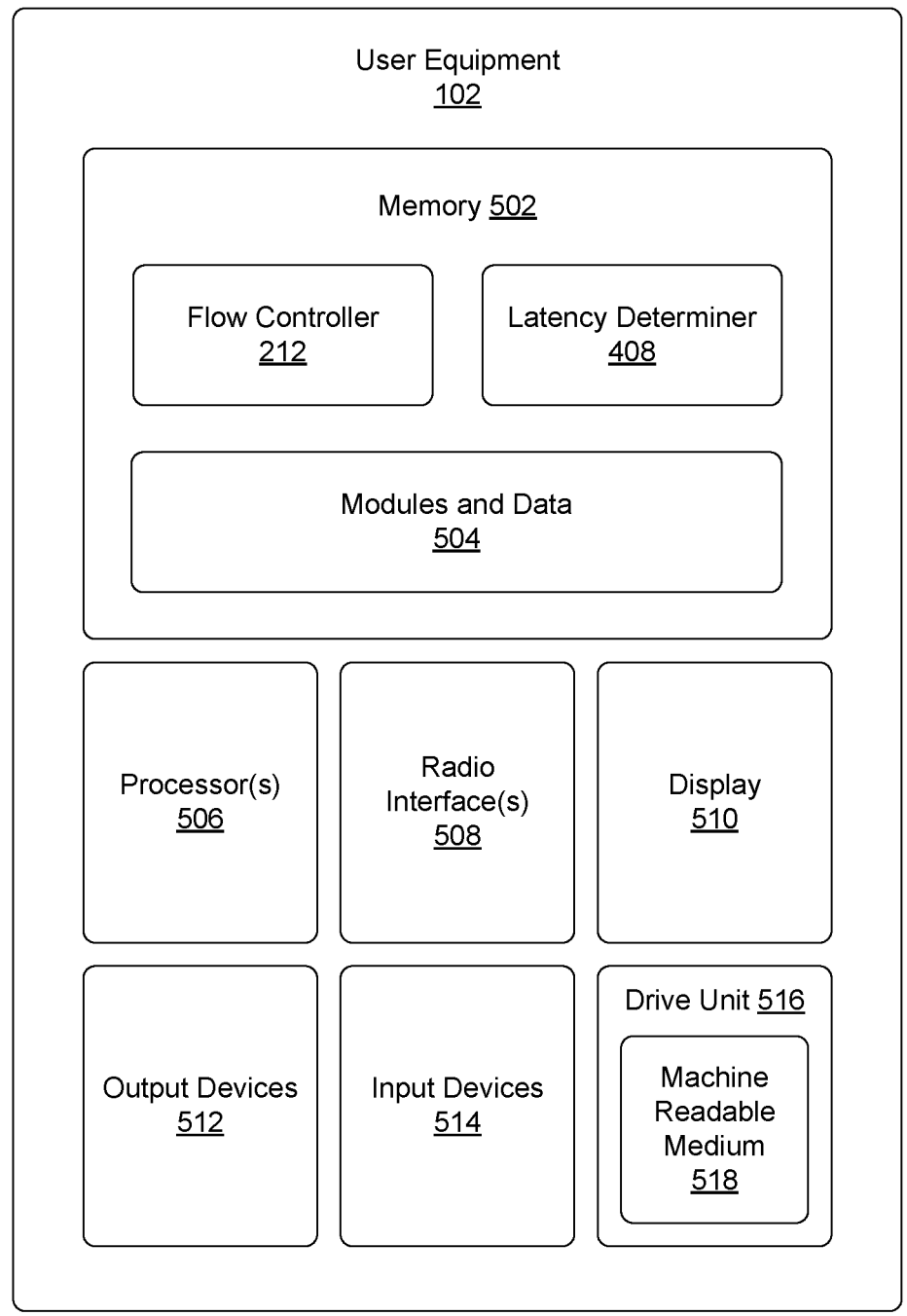
FIG. 5 depicts an example system architecture for a UE.

FIG. 5 depicts an example system architecture for a UE 102, in accordance with various examples. As shown, a UE 102 can have memory 502 storing a flow controller 212, a latency determiner 408, and other modules and data 504. A UE 102 can also have processor(s) 506, radio interfaces 508, a display 510, output devices 512, input devices 514, and/or a drive unit 516 including a machine readable medium 518.

In various examples, the memory 502 can include system memory, which may be volatile (such as RAM), non-volatile (such as ROM, flash memory, etc.) or some combination of the two. The memory 502 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

The flow controller 212 and/or latency determiner 408 can be substantially similar to the flow controller 212 and/or latency determiner 408 described above, but execute at the UE 102 to determine or infer packet latency goals of outgoing data packets 210 and connection latencies associated with connections to a first base station 106 and a second base station 108, such that the flow controller 212 can route data packets 210 over the first leg 116 and/or second leg 118 of a split bearer 114. The other modules and data 504 can be utilized by the UE 102 to perform or enable performing any action taken by the UE 102. The modules and data 504 can include a UE platform, operating system, and applications, and data utilized by the platform, operating system, and applications.

In various examples, the processor(s) 506 can be a central processing unit (CPU), a graphics processing unit (GPU), or both CPU and GPU, or any other type of processing unit. Each of the one or more processor(s) 506 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 506 may also be responsible for executing all computer applications stored in the memory 502, which can be associated with common types of volatile (RAM) and/or nonvolatile (ROM) memory.

The radio interfaces 508 can include transceivers, modems, interfaces, antennas, and/or other components that perform or assist in exchanging radio frequency (RF) communications with base stations of the telecommunication network, a Wi-Fi access point, or otherwise implement connections with one or more networks. For example, the radio interfaces 508 can be compatible with multiple radio access technologies, such as 5G radio access technologies and 4G/LTE radio access technologies, and be configured to establish dual connections with different base stations including a first base station 106 and a second base station 108 as described herein.

The display 510 can be a liquid crystal display or any other type of display commonly used in UEs 102. For example, display 510 may be a touch-sensitive display screen, and can then also act as an input device or keypad, such as for providing a soft-key keyboard, navigation buttons, or any other type of input. The output devices 512 can include any sort of output devices known in the art, such as a display 510, speakers, a vibrating mechanism, and/or a tactile feedback mechanism. Output devices 512 can also include ports for one or more peripheral devices, such as headphones, peripheral speakers, and/or a peripheral display. The input devices 514 can include any sort of input devices known in the art. For example, input devices 514 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 518 can store one or more sets of instructions, such as software or firmware, that embodies any one or more of the methodologies or functions described herein. The instructions can also reside, completely or at least partially, within the memory 502, processor(s) 506, and/or radio interface(s) 508 during execution thereof by the UE 102. The memory 502 and the processor(s) 506 also can constitute machine readable media 518.

Example Operations

Figure 6:
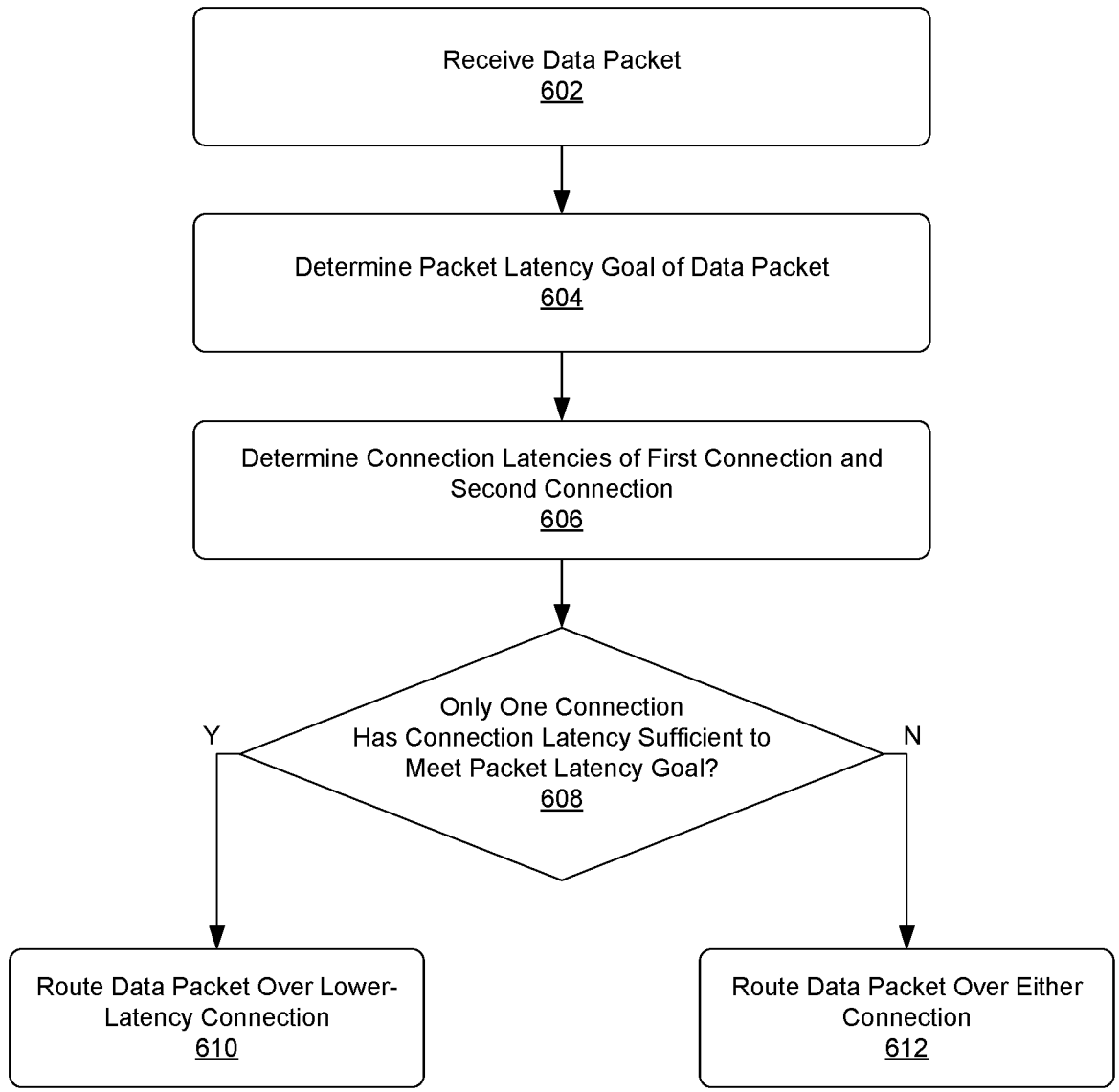
FIG. 6 depicts a flowchart of a process by which a flow controller of a first base station can route data packets to a UE over either a first leg of a split bearer or a second leg of the split bearer.

FIG. 6 depicts a flowchart of a process by which a flow controller 212 of a first base station 106 can route data packets 210 to a UE 102 over either a first leg 116 of a split bearer 114 or a second leg 118 of the split bearer 114 that passes through a second base station 108. The split bearer 114 may have been previously established from the core network 104 to the UE 102 via the first base station 106 and the second base station 108, or can be established at the beginning of FIG. 6 if it has not yet been established.

At block 602, the flow controller 212 can receive a data packet 210 for the UE 102 from the core network 104 via the split bearer 114. In some examples, the data packet 210 can be an IP packet received from the core network 104. In other examples, the data packet 210 can be an IP packet or other type of packet that has been encapsulated into output of an upper layer, such as a packet encapsulated into output of an SDAP layer.

At block 604, the flow controller 212 can determine a packet latency goal associated with the data packet 210. For example, the flow controller 212 or an associated module can inspect the data packet 210 to find a DSCP value, SDAP header information, and/or any other information that is mapped to, or otherwise associated with, a QoS class, QoS identifier, CoS level, service type, traffic type, priority level, and/or other packet latency goal. In some examples, the packet latency goal associated with the data packet 210 may indicate that the data packet 210 is or is not a low-latency packet. In other examples, the flow controller 212 can consider a data packet 210 with a packet latency goal below a threshold value as a low-latency packet, and consider a data packet 210 with a packet latency goal at or above that threshold value as a general non-low-latency packet.

At block 606, the flow controller 212 can determine a first connection latency of a first connection from the first base station 106 to the UE 102 and a second connection latency of a second connection from the second base station 108 to the UE 102. For example, the flow controller 212 can measure, estimate, or obtain connection latency information associated with both connections based on RTT measurements, radio conditions, available bandwidth, network congestion levels, numbers of connections to the first base station 106 and/or second base station 108, buffer fullness levels at the first base station 106 and/or second base station 108, and/or any other data associated with how quickly the first base station 106 and/or second base station 108 can transmit data to the UE 102.

At block 608, the flow controller 212 can determine, based on the first connection latency and the second connection latency, if only one of the two connections associated with the legs of the split bearer 114 can meet the packet latency goal of the data packet 210. If only one of the two connections associated with the legs of the split bearer 114 can meet the packet latency goal of the data packet 210, at block 610 the flow controller 212 can route the data packet 210 via the leg of the split bearer 114 that is associated with that connection.

However, if either connection has a connection latency sufficient to meet the packet latency goal of the data packet 210, at block 612 the flow controller 212 can route the data packet 210 over either the first leg 116 or the second leg 118. For example, if the first leg 116 has the lower connection latency and is not currently being used, the flow controller 212 may choose to route non-low-latency packets over the first leg 116, or route some of those data packets 210 via the first leg 116 and others via the second leg 118. However, if the first leg 116 is being heavily used to route low-latency packets, the flow controller 212 can instead choose to route other non-low-latency packets over the second leg 118.

As an example, if the flow controller 212 has identified a data packet 210 as a low-latency packet at block 604, the flow controller 212 can determine at block 608 that the data packet 210 should be routed only via the leg of the split bearer 114 that is associated with the lower connection latency. As another example, if information in a data packet 210 maps to a certain packet latency goal, and only one of the two connections is associated with a connection latency sufficient to meet that packet latency goal, the flow controller 212 can determine at block 608 that the data packet 210 should be routed only via a corresponding leg of the split bearer 114. For instance, when the first connection associated with the first leg 116 has a lower connection latency than the second connection associated with the second leg 118, the data packet 210 can be encapsulated into a PDU output by the PDCP layer 202 and be included in the first set of PDUs 214 sent over the first leg 116. However, in other examples, if the connection associated with the second leg 118 has the lower connection latency, the data packet 210 can be encapsulated into a PDU output by the PDCP layer 202 and be included in the second set of PDUs 216 sent over the second leg 118.

Overall, data packets 210 associated with lower packet latency goals, such as data packets 210 associated with time-sensitive and/or high priority services, can be routed over a leg of a split bearer 114 that is associated with a lower connection latency than the other leg. Accordingly, even a set of data packets 210 can be routed over both legs, individual data packets 210 with lower packet latency goals than other data packets 210 can be routed over the lower-latency leg in order to reach the UE 102 more quickly.

Figure 7:
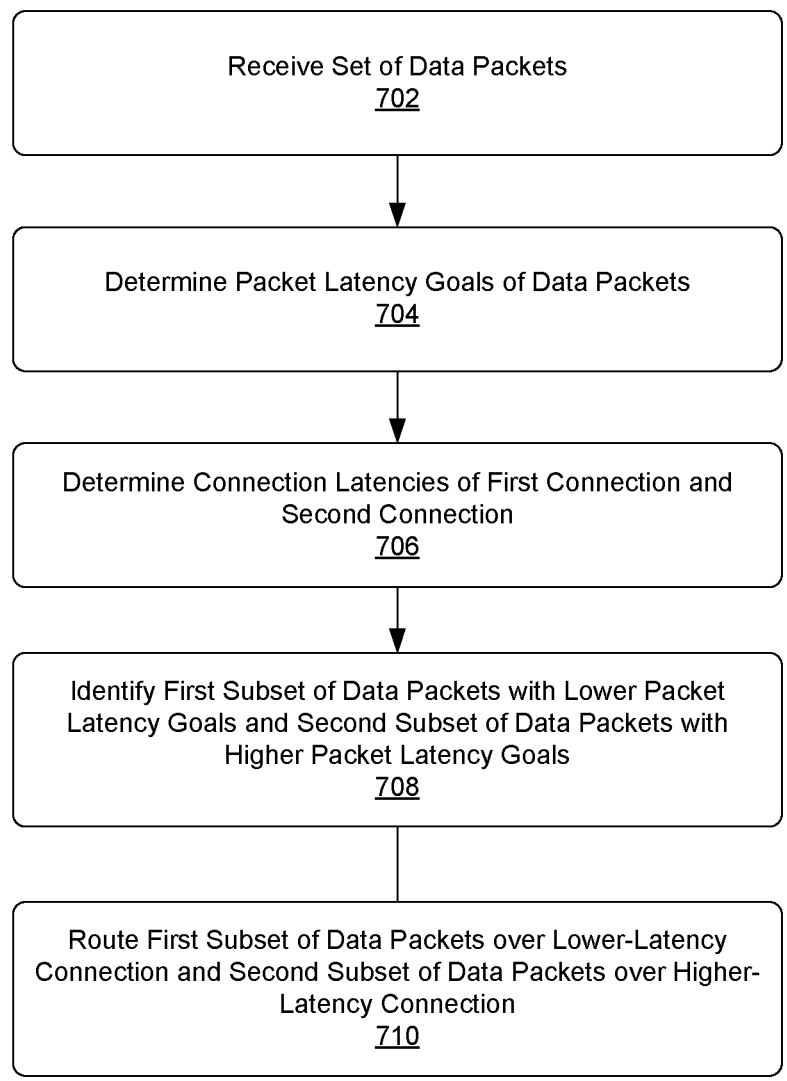
FIG. 7 depicts a flowchart of a process by which a flow controller of a first base station can route a set of data packets to a UE over a first leg of a split bearer and a second leg of the split bearer.

FIG. 7 depicts a flowchart of a process by which a flow controller 212 of a first base station 106 can route a set of data packets 210 to a UE 102 over a first leg 116 of a split bearer 114 and a second leg 118 of the split bearer 114 that passes through a second base station 108. The split bearer 114 may have been previously established from the core network 104 to the UE 102 via the first base station 106 and the second base station 108, or can be established at the beginning of FIG. 7 if it has not yet been established.

At block 702, the flow controller 212 can receive a set of data packets 210 for the UE 102 from the core network 104 via the split bearer 114. In some examples, the set of data packets 210 can include IP packets received from the core network 104. In other examples, the set of data packets 210 can be a set of IP packets or other types of packets that have been encapsulated into output of an upper layer, such as packets encapsulated into output of an SDAP layer.

At block 704, the flow controller 212 can determine packet latency goals associated with the data packets 210 in the set. For example, the flow controller 212 or an associated module can inspect each data packet 210 to find a DSCP value, SDAP header information, and/or any other information that is mapped to, or otherwise associated with, a QoS class, QoS identifier, CoS level, service type, traffic type, priority level, and/or other packet latency goal.

At block 706, the flow controller 212 can determine a first connection latency of a first connection from the first base station 106 to the UE 102 and a second connection latency of a second connection from the second base station 108 to the UE 102. For example, the flow controller 212 can measure, estimate, or obtain connection latency information associated with both connections based on RTT measurements, radio conditions, available bandwidth, network congestion levels, numbers of connections to the first base station 106 and/or second base station 108, buffer fullness levels at the first base station 106 and/or second base station 108, and/or any other data associated with how quickly the first base station 106 and/or second base station 108 can transmit data to the UE 102.

At block 708, the flow controller 212 can identify a first subset of the data packets 210 associated with lower packet latency goals and a second subset of the data packets 210 associated with higher packet latency goals. In some examples, packet latency goals associated with one or more of the data packet 210 may indicate that the data packets 210 are or are not low-latency packets, and the flow controller 212 can group low-latency packets into the first subset and the non-low-latency packets into the second subset. In other examples, the flow controller 212 can place data packets 210 with packet latency goals below a threshold in the first subset and other data packets 210 in the second subset, balance the subsets such that each subset has a predefined percentage of the overall number of data packets 210 in the set, balance the subsets based on availability or load levels associated with the first base station 106 and the second base station 108, and/or otherwise divide the set of data packets between a first subset and second subset such that data packets 210 associated with lower packet latency goals are placed in the first subset.

At block 710, the flow controller 212 can route the first subset of the data packets 210 via the leg of the split bearer 114 associated with the connection found at block 708 to have the lower connection latency, and route the second subset of the data packets 210 via the other leg of the split bearer 114. For example, if the first leg 116 is associated with the lower-latency connection, the first subset of the data packets 210 can be encapsulated into the first set of PDUs 214 and be sent over the first leg 116, and the second subset of the data packets 210 can be encapsulated into the second set of PDUs 216 and be sent over the second leg 118.

Although FIGS. 6 and 7 are described above with respect to a flow controller 212 at a first base station 106 routing downstream data packets 210 to a UE 102 over either a first leg 116 and/or a second leg 118 of a split bearer 114, in other examples a flow controller 212 of a UE 102 can use substantially similar processes to route upstream data packets 210 to a core network 104 via the first leg 116 and/or the second leg 118 of the split bearer 114. For example, a flow controller 212 of a UE 102 can use the steps of FIG. 6 to route upstream data packets 210 on a packet-by-packet basis, or use the steps of FIG. 7 to route subsets of upstream data packets 210 identified out of a set of data packets to be sent by the UE 102 to the core network 104.

CONCLUSION

Overall, data packets 210 associated with lower packet latency goals, such as data packets 210 associated with time-sensitive and/or high priority services, can be routed over a leg of a split bearer 114 that is associated with a lower connection latency than the other leg. Accordingly, even though a set of data packets 210 can be routed over both legs, individual data packets 210 with lower packet latency goals than other data packets 210 can be routed over the lower-latency leg in order to reach their destination more quickly.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:
1. A method comprising:
    receiving, by a flow controller operating on a first base station at a Packet Data Convergence Protocol (PDCP) layer, a set of data packets for a user equipment (UE) from a core network over a split bearer, wherein the split bearer divides at the first base station into a first leg that passes through the first base station to the UE and a second leg that passes from the first base station to the UE via a second base station; determining, by the flow controller, packet latency goals associated with data packets of the set of data packets;

determining, by the flow controller, a first connection latency associated with a first connection from the first base station to the UE and a second connection latency associated with a second connection from the second base station to the UE;

determining, by the flow controller, that one of the first leg and the second leg has lower latency than the other of the first leg and the second leg based on a comparison of the first connection latency and the second connection latency;

grouping, by the flow controller and based on PDCP aggregation, the set of data packets into a first subset associated with lower packet latency goals and a second subset associated with higher packet latency goals, wherein the lower packet latency goals are packet latency goals that are relatively lower compared with the higher packet latency goals;

routing, by the flow controller, the first subset to the UE via the one of the first leg and the second leg that has the lower latency and the second subset to the UE via the other of the first leg and the second leg; and routing to the UE, by the flow controller, the first subset and the second subset via different ones of the first leg and the second leg based at least in part on a change to at least one of the first connection latency and second connection latency.

2. The method of claim 1, wherein the routing is based on PDCP aggregation.

3. The method of claim 1, wherein the flow controller determines the packet latency goals by inspecting the data packets for information about at least one of a priority level, a service type, a Quality of Service (QoS) value, or a Class of Service (CoS) value.

4. The method of claim 3, wherein the information is indicated by a Differentiated Services Code Point (DSCP) field in headers of the data packets.

5. The method of claim 3, wherein the information is indicated by Service Data Adaptation Protocol (SDAP) headers of the data packets.

6. The method of claim 1, wherein one of the first base station and the second base station is a fifth generation (5G) base station and another one of the first base station and the second base station is a Long-Term Evolution (LTE) base station linked to the 5G base station in a dual connectivity configuration.

7. The method of claim 1, wherein the flow controller determines at least one of the first connection latency and the second connection latency at least in part based on measuring a round-trip time associated with a data transmission between the first base station and the UE over the first connection or between the second base station and the UE over the second connection.

8. The method of claim 1, wherein the flow controller determines at least one of the first connection latency and the second connection latency at least in part based on at least one of radio conditions, available bandwidth, network congestion levels, numbers of connections to the first base station or the second base station, or a buffer fullness level at the first base station or the second base station.

9. A base station, comprising: one or more processors; transmission interfaces associated with a first connection to a user equipment (UE), a second connection to a second base station, and a third connection to a core network of a telecommunication network;

memory storing computer-executable instructions for a flow controller that, when executed by the one or more processors, cause the flow controller to operate at a Packet Data Convergence Protocol (PDCP) layer to:

receive a set of data packets for the UE from the core network via a split bearer over the third connection, wherein the split bearer divides into a first leg that passes over the first connection to the UE and a second leg that passes over the second connection to the second base station and from the second base station to the UE;

determine packet latency goals associated with data packets of the set of data packets;

determine a first connection latency associated with the first connection and a second connection latency associated with the second connection;

determine that one of the first leg and the second leg has a lower latency than the other of the first leg and the second leg based on a comparison of the first connection latency and the second connection latency;

group, based on PDCP aggregation, the set of data packets into a first subset associated with lower packet latency goals and a second subset associated with higher packet latency goals, wherein the lower packet latency goals are packet latency goals that are relatively lower compared with the higher packet latency goals;

route the first subset to the UE via the one of the first leg and the second leg that has the lower latency and the second subset to the UE via the other of the first leg and the second leg; and route, to the UE, the first subset and the second subset via different ones of the first leg and the second leg based at least in part on a change to at least one of the first connection latency and second connection latency.

10. The base station of claim 9, wherein the flow controller determines the packet latency goals by inspecting the data packets for information about at least one of a priority level, a service type, a Quality of Service (QoS) value, or a Class of Service (CoS) value.

11. The base station of claim 10, wherein one of the base station and the second base station is a fifth generation (5G) base station and another one of the base station and the second base station is a Long-Term Evolution (LTE) base station linked to the 5G base station in a dual connectivity configuration.

12. The base station of claim 9, wherein the flow controller determines at least one of the first connection latency and the second connection latency at least in part based on measuring a round-trip time associated with a data transmission between the base station and the UE over the first connection or between the second base station and the UE over the second connection.

13. The base station of claim 9, wherein the flow controller determines at least one of the first connection latency and the second connection latency at least in part based on at least one of radio conditions, available bandwidth, network congestion levels, numbers of connections to the base station or the second base station, or a buffer fullness level at the base station or the second base station.

14. One or more non-transitory computer-readable media storing computer-executable instructions that, when executed by one or more processors of a base station of a telecommunication network, cause the base station to perform operations of a flow controller at a Packet Data Convergence Protocol (PDCP) layer, the operations comprising:
receive a set of data packets for a user equipment (UE) from a core network via a split bearer, wherein the split bearer divides into a first leg that passes over a first connection from the base station to the UE and a second leg that passes over a second connection from the base station to a second base station and from the second base station to the UE;
determine packet latency goals associated with data packets of the set of data packets;
determine a first connection latency associated with the first connection and a second connection latency associated with the second connection;
determine that one of the first leg and the second leg has a lower latency than the other of the first leg and the second leg based on a comparison of the first connection latency and the second connection latency;
group, based on PDCP aggregation the set of data packets into a first subset associated with lower packet latency goals and a second subset associated with higher packet latency goals, wherein the lower packet latency goals are packet latency goals that are relatively lower compared with the higher packet latency goals;
route the first subset to the UE via the one of the first leg and the second leg that has the lower latency and the second subset to the UE via the other of the first leg and the second leg; and
route, to the UE, the first subset and the second subset via different ones of the first leg and the second leg based at least in part on a change to at least one of the first connection latency and second connection latency.

15. The one or more non-transitory computer-readable media of claim 14, wherein the packet latency goals are determined by inspecting the data packets for information about at least one of a priority level, a service type, a Quality of Service (QoS) value, or a Class of Service (CoS) value.

16. The one or more non-transitory computer-readable media of claim 14, wherein one of the base station and the second base station is a fifth generation (5G) base station and another one of the base station and the second base station is a Long- Term Evolution (LTE) base station linked to the 5G base station in a dual connectivity configuration.

17. The one or more non-transitory computer-readable media of claim 14, wherein at least one of the first connection latency and the second connection latency is determined at least in part based on one of measuring a round-trip time associated with a data transmission between the base station and the UE over the first connection or between the second base station and the UE over the second connection, radio conditions, available bandwidth, network congestion levels, numbers of connections to the base station or the second base station, or a buffer fullness level at the base station or the second base station.

* * * * *